United States Patent
Lee

(10) Patent No.: US 12,264,222 B2
(45) Date of Patent: Apr. 1, 2025

(54) METHOD FOR PREPARATION OF ANTIBACTERIAL BIO-FILLER FOR PLASTIC AND ANTIBACTERIAL BIO-FILLER FOR PLASTIC PREPARED THEREBY

(71) Applicant: LIGNUM Inc., Daejeon (KR)

(72) Inventor: Sang-Hyun Lee, Daejeon (KR)

(73) Assignee: LIGNUM INC., Daejeon (KR)

( * ) Notice: Subject to any disclaimer, the term of this patent is extended or adjusted under 35 U.S.C. 154(b) by 577 days.

(21) Appl. No.: 17/634,168

(22) PCT Filed: Oct. 28, 2020

(86) PCT No.: PCT/KR2020/014836
§ 371 (c)(1),
(2) Date: Feb. 9, 2022

(87) PCT Pub. No.: WO2022/092343
PCT Pub. Date: May 5, 2022

(65) Prior Publication Data
US 2022/0356308 A1 Nov. 10, 2022

(51) Int. Cl.
C08H 8/00 (2010.01)
C08J 3/14 (2006.01)
C08J 3/20 (2006.01)
C08L 1/02 (2006.01)
C08L 97/02 (2006.01)

(52) U.S. Cl.
CPC .............. *C08H 8/00* (2013.01); *C08J 3/14* (2013.01); *C08J 3/20* (2013.01); *C08L 1/02* (2013.01); *C08L 97/02* (2013.01)

(58) Field of Classification Search
CPC .............................. C08L 97/02; C08L 5/14
See application file for complete search history.

(56) References Cited

FOREIGN PATENT DOCUMENTS

| | | |
|---|---|---|
| CA | 3083465 A1 | 6/2019 |
| JP | 2003104815 A | 4/2003 |
| JP | 2010030081 A | 2/2010 |
| JP | 2011219716 A | 11/2011 |
| JP | 2015214035 A | 12/2015 |
| KR | 101809564 B1 | 12/2017 |
| KR | 101889744 B1 | 8/2018 |
| KR | 101962239 B1 | 3/2019 |
| KR | 20190075698 A | 7/2019 |
| KR | 102087724 B1 | 3/2020 |
| WO | WO2015200584 A1 | 12/2015 |
| WO | WO2017222084 A1 | 12/2017 |
| WO | WO2019094444 A1 | 5/2019 |

OTHER PUBLICATIONS

English Machine Translation of JP2015214035 (A) obtained on Sep. 9, 2024 from https://worldwide.espacenet.com/publicationDetails/biblio?CC=JP&NR=2015214035A&KC=A&FT=D&ND=3&date=20151203&DB=EPODOC&locale=en_EP (Year: 2015).*
International search report of PCT/KR2020/014836, Jul. 26, 2021.

* cited by examiner

*Primary Examiner* — Ling Siu Choi
*Assistant Examiner* — Olga Lucia Donahue
(74) *Attorney, Agent, or Firm* — STIP Law Group, LLC

(57) ABSTRACT

Disclosed herein is a method for preparing an antibacterial bio-filler for plastics and an antibacterial bio-filler for plastics, prepared thereby. More specifically a method for preparing an oleophilic antibacterial bio-filler for plastics from hydrophilic lignocellulosic biomass and an antibacterial bio-filler for plastics prepared thereby are provided.

11 Claims, 2 Drawing Sheets

METHOD FOR PREPARATION OF ANTIBACTERIAL BIO-FILLER FOR PLASTIC AND ANTIBACTERIAL BIO-FILLER FOR PLASTIC PREPARED THEREBY

CROSS-REFERENCE TO RELATED APPLICATIONS

This application is the U.S. National Phase under 35 U.S.C. § 371 of International Application No. PCT/KR2020/014836 filed on Oct. 28, 2020.

TECHNICAL FIELD

The present disclosure relates to a method for preparing an antibacterial bio-filler for plastics and to a bio-filler for plastics prepared thereby and, more specifically, to a method for preparing an oleophilic antibacterial bio-filler for plastics from hydrophilic lignocellulosic biomass and an antibacterial bio-filler for plastics prepared thereby.

BACKGROUND ART

With the emergence of serious global warming and environmental pollution problems, interests in biomaterials have significantly increased that can substitute for petroleum-derived materials. Among others, plastic materials, which are for the most part derived from petroleum, are extensively applied to automobile interior materials, construction materials, packaging materials, etc. These materials produce a large amount of carbon dioxide and pollutants when incinerated after disposal. In order to fundamentally solve such problems, technologies associated with bio-plastic materials have attracted attention.

Generally, there are three types of materials that are available for manufacturing plastic products. First mentioned are base resin materials for use in plastic products, such as polyethylene (PE), polypropylene (PP), polyvinylchloride (PVC), polystyrene, and so on, followed by additive materials for providing additional functions such as colors, oxidation resistance, UV stability, etc. Finally, fillers are used to improve plastic properties, such as strength, stiffness, etc. These three types of materials are properly compounded to afford a compounded resin which is injected or extruded into desired plastic products.

Thus far, there have been many reports on bio-plastic material production in conjunction with research into the substitution of bio-materials for plastic product materials. Inter alia, recently extensive studies have been done on techniques utilizing non-edible lignocellulosic biomass as raw materials for bioplastics.

Such a lignocellulosic biomass is a natural polymeric substance composed of cellulose, hemicellulose, and lignin. Among them, the lignin component has an antibacterial property and as such can be utilized as a natural antibacterial agent.

However, most lignin is produced as a by-product in a hydrated, modified low-molecular form (kraft lignin) from the pulp manufacturing process. As much as 98% of lignin is used as a fuel. For use as a functional material for preparation of plastics, lignin should be functionalized to find applications according to fields. However, relevant technologies have not yet been properly developed.

By way of example, the lignin produced from a pulp manufacturing process has a molecular weight of as low as tens to thousands and increases in hydrophilicity during manufacture. However, lignin byproducts must be made to be hydrophobic and of high molecular weight.

With respect to related art pertaining to the manufacture of a bio-filler for plastics from biomass containing lignin, reference may be made to Korean Patent Number 10-2087724, which discloses a method for preparing an antibacterial lignin-derived material wherein chemical modification of lignin is conducted by hydrophobilizing lignin produced from a pulp manufacturing process through conjugation of fatty acids thereto and the fatty acid-lignin particles thus obtained are polymerized by reaction with allylated cellulose fibers or particles thereof. However, these processes are complicated which results in increased production cost. Thus, it is difficult to make the whole process economically feasible.

Another related art is observed in Korean Patent Number 10-1889744, which discloses a technique of producing a lignin composite for plastics in which a lignin extract from a pulp manufacturing process and silane-based compound-modified nanocellulose produced by mechanically pulverizing pulp are mixed to give a modified lignin-nanocellulose composite which is then mixed with a maleic anhydride-grafted polypropylene substance. However, this technique has the disadvantages that the process is very complicated and has limitations in producing a substance for general-purpose antibacterial plastics.

As another related art, Korean Patent Number 10-1809564 discloses that lignin is extracted from lignocellulosic biomass through a concentrated sulfuric acid pretreatment process and is demonstrated to be used as a plastic filler substance. However, the use of the concentrated sulfuric acid may cause a problem in process stability. In addition, lignin is present in an amount of up to 30 wt % in the lignocellulosic biomass and in consideration of this process yield, it may be difficult to achieve an economical advantage. Furthermore, it is impossible to apply the lignin as an antibacterial plastic substance because the lignin is not functionalized.

Korean Patent Number 10-1962239 discloses a method in which lignocellulosic biomass is entirely modified through hydrophobization treatment with a strong acid, thereby producing a plastic filler at a yield of 30 weight % or higher. Of the biomass components, hemicellulose is poor in thermal decomposition properties (Yang H, Yan R, Chen H, Lee D H, Zheng C (2007) Characteristics of hemicellulose, cellulose and lignin pyrolysis. Fuel 86(12):1781-1788). Thus, when used as a plastic filler, hemicellulose undergoes thermal decomposition during the plastic manufacturing procedure, causing a defective on the surface of the plastic product.

In relation to the development of lignocellulosic biomass-derived nanosubstance, International Patent Publication No. WO 2015-200584 discloses a technique in which lignocellulosic biomass is treated with sulfur dioxide, ethanol, and water to dissolve most hemicellulose and lignin in small molecule forms and the residual, small-molecule lignin-adsorbed cellulose fibers thus obtained are treated with the enzyme cellulase to remove non-crystalline cellulose components through hydrolysis, followed by mechanical refinement to afford a lignin-nanocellulose composite. However, in order to convert cellulose fibers into nanocellulose with a crystallinity of 60% or higher by chemical processing, the hydrolysis of non-crystalline cellulose through additional enzymatic treatment using cellulase adds a lot of cost. In addition, among the components of lignocellulosic biomass, lignin (accounting for 15-35 wt % of the total weight of lignocellulosic biomass) and hemicellulose (accounting for 5-20 wt % of the total weight of lignocellulosic biomass) are mostly removed, so that the yield remains under 47% at most. Furthermore, the lignin is decomposed and dissolved, for the most part, as low-molecular forms in the ethanol/water solution. The mechanical refinement also consumes a lot of energy. After being added in the reaction, sulfur dioxide reacts with lignin and remains in a covalent bond form. During production of the plastic, toxic gas in the form of SOx is generated, which restrains the application of the technique. Above all, the remaining lignin is insignificant and thus impossible to use as an antibacterial substance. The complicated processes increase production cost and are not economically feasible.

Therefore, there is a very imperative need to develop a novel antibacterial bio-filler for plastics and a preparation method wherein the bio-filler has excellent thermal properties as a result of removing hemicellulose from the inexpensive raw material, lignocellulosic biomass, in a simple process, exhibits antibacterial activity due to the functionalized lignin thereof, and is hydrophobic enough to show desired dispersion properties upon plastic production.

RELATED ART DOCUMENT

Patent Literature (Patent Literature 0001) Korean Patent Number 10-2087724 (Mar. 12, 2020)
(Patent Literature 0002) Korean Patent Number 10-1889744 (Aug. 21, 2018)
(Patent Literature 0003) Korean Patent Number 10-1809564 (Dec. 15, 2017)
(Patent Literature 0004) Korean Patent Number 10-1962239 (Mar. 27, 2019)
(Patent Literature 0005) International Patent Publication Number WO 2015-200584 (Dec. 30, 2015)

DISCLOSURE

Technical Problem

An aspect of the present disclosure is to provide a method for preparing an antibacterial bio-filler for plastics at high yield, wherein the antibacterial bio-filler has excellent thermal properties as a result of removing hemicellulose from non-edible raw material lignocellulosic biomass in a simple process with economical production cost, exhibits antibacterial activity due to the functionalized lignin thereof, and is highly oleophilic and hydrophobic enough to show excellent dispersion properties upon plastic production.

Another aspect of the present disclosure is to provide a light-weight, eco-friendly antibacterial bio-filler for plastics, prepared according to the preparation method, and an antibacterial plastic substance comprising same.

Technical Solution

According to an aspect thereof, the present disclosure provides a method for preparing a bio-filler for a plastic, the method comprising the steps of: (a) removing at least a part of hemicellulose components from lignocellulosic biomass including lignin, cellulose, and hemicellulose; (b) modifying the hemicellulose-removed lignocellulosic biomass with an acid; and (c) adding a base to the resultant reaction mixture obtained in step (b) to neutralize remaining acidic components, followed by removing water-soluble materials from the neutralized reaction mixture to obtain solid particles, wherein the solid particles obtained in step (c) contain hemicellulose-derived components in an amount of 5 wt % or less, based on the total weight of components derived from lignin, cellulose, and hemicellulose thereof.

In an embodiment, the acid in step (b) may be an organic acid of 1 to 20 carbon atoms; an inorganic acid selected from sulfuric acid, hydrochloric acid, phosphoric acid, nitric acid, and a combination thereof; a mixture of the organic acid and the inorganic acid; or a mixture of an organic acid and the combination of the inorganic acids.

In an embodiment, the solid particles obtained in step (c) may contain a hemicellulose-derived component in an amount of 3 wt % or less, based on the total weight of components derived from lignin, cellulose, and hemicellulose thereof.

In an embodiment, the solid particles in step (c) may contain lignin-derived components in an amount of 1 wt % to 99 wt %, based on the total weight of components derived from lignin, cellulose, and hemicellulose, or cellulose-derived components in an amount of 1 wt % to 99 wt %, based on the total weight of components derived from lignin, cellulose, and hemicellulose.

In an embodiment, the solid particles in step (c) may contain lignin-derived components in an amount of 20 wt % to 80 wt % and cellulose-derived components in an amount of 20 wt % to 80 wt %, based on the total weight of components derived from lignin, cellulose, and hemicellulose.

In an embodiment, the removal of hemicellulose components from the biomass in step (a) may be conducted by a process selected from a heat treatment process, a hot-water process, a steam explosion process, an acid-containing steam explosion process, and a combination thereof. Particularly, the removal of hemicellulose components in step (a) may be conducted by a hot water process.

In an embodiment, the acid in step (b) may be sulfuric acid and the sulfuric acid may be used at a concentration of 0.5 to 70 wt %, based on the total weight of the aqueous solution including pulverized biomass and acid.

In an embodiment, the base in step (c) may be selected from sodium hydroxide (NaOH), potassium hydroxide (KOH), calcium hydroxide ($Ca(OH)_2$), ammonia ($NH_3$), lithium hydroxide (LiOH), calcium carbonate ($CaCO_3$), potassium carbonate ($K_2CO_3$), sodium carbonate ($Na_2CO_3$), potassium bicarbonate ($KHCO_3$), magnesium hydroxide ($Mg(OH)_2$), calcium oxide (CaO), magnesium oxide (MgO), and sodium bicarbonate (NaHCO3), and a combination thereof.

According to another aspect thereof, the present disclosure provides an antibacterial bio-filler for plastics, prepared by the method for preparing a bio-filler for plastics.

According to a further aspect thereof, the present disclosure provides an antibacterial plastic composition comprising an antibacterial bio-filler for plastics, prepared by the method for preparing a bio-filler for plastics. In an embodiment, the plastic composition may comprise the bio-filler for plastics in an amount of 0.1 to 90 wt %, based on the total weight thereof.

According to yet another aspect thereof, the present disclosure provides an antibacterial product comprising the plastic composition.

Advantageous Effects

A method for preparing an antibacterial bio-filler for plastics in accordance with the present disclosure is advantageous in that the antibacterial bio-filler has excellent thermal properties as a result of removing hemicellulose from non-edible raw material lignocellulosic biomass in a simple process with economical production cost, exhibits antibacterial activity due to the functionalized lignin thereof, and is highly oleophilic and hydrophobic enough to show excellent dispersion properties upon plastic production.

In addition, a composite plastic product comprising the antibacterial bio-filler for plastics, prepared by the preparation method according to the present disclosure has improved antibacterial activity and is remarkably low in weight compared to plastic products produced using mineral fillers such as talc, etc., thus finding applications in products required for antibacterial activity and lightness, such as materials for mobile vehicles, constructions, packages, etc.

Furthermore, originating from plants, the bio-filler for plastics, prepared from lignocellulosic biomass according to the present disclosure, can be completely combusted upon incineration, in contrast to mineral-based substances. Thus, the bio-filler of the present disclosure is convenient and easy to treat and is very advantageous in terms of eco-friendliness.

MODE FOR CARRYING OUT THE INVENTION

Figure 1:
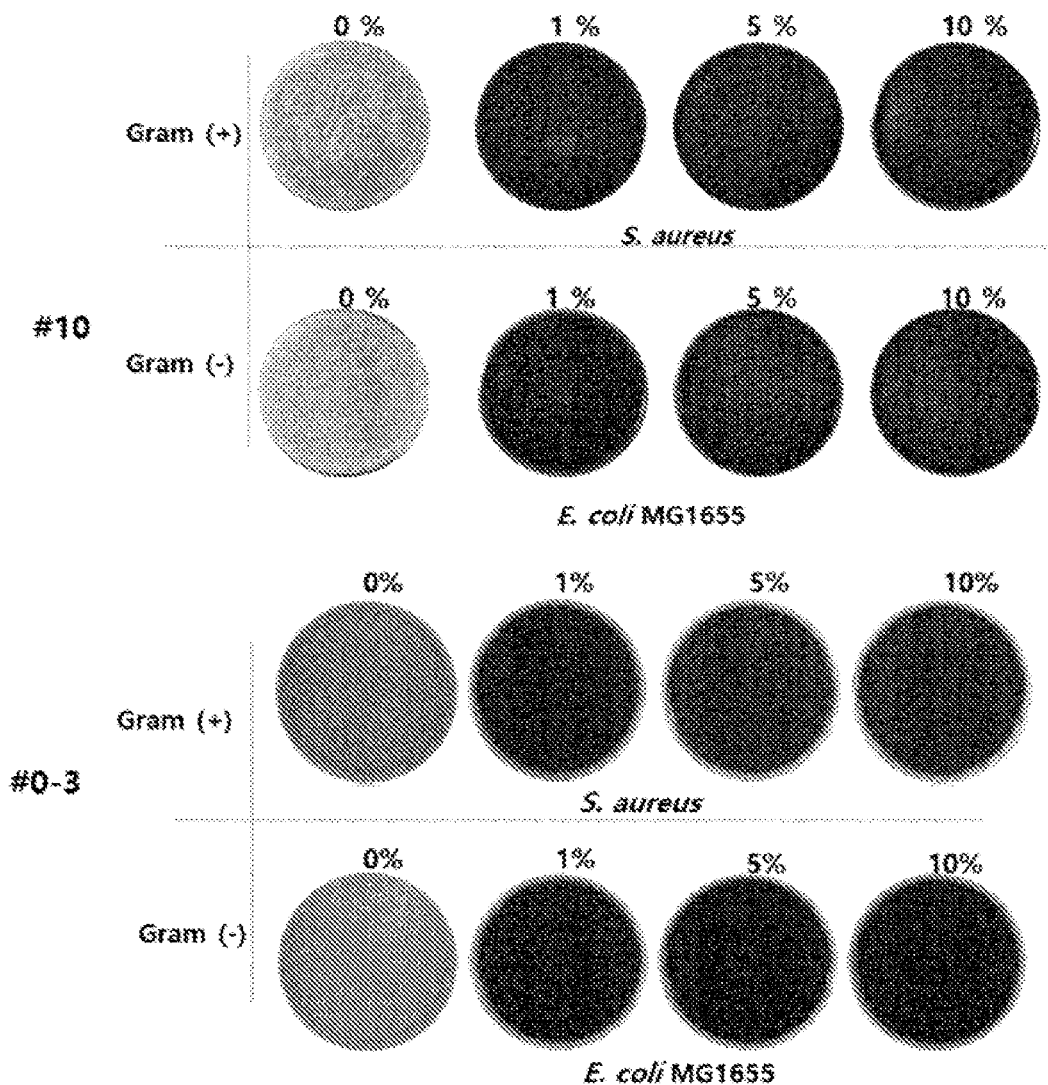
FIG. 1 shows M9 agar plates containing 1-10 wt % of the biomaterial prepared in the Example on which *Escherichia coli* and *Staphylococcus aureus* were spread and grown for 12 hours so as to evaluate antibacterial activity.

A method for preparing a bio-filler for a plastic according to the present disclosure comprises the steps of: (a) removing at least a part of hemicellulose components from lignocellulosic biomass including lignin, cellulose, and hemicellulose; (b) modifying the hemicellulose-removed lignocellulosic biomass with an acid; and (c) adding a base to the resultant reaction mixture obtained in step (b) to neutralize remaining acidic components, followed by removing water-soluble materials from the neutralized reaction mixture to obtain solid particles, wherein the solid particles obtained in step (c) contain hemicellulose-derived components in an amount of 5 wt % or less, based on the total weight of components derived from lignin, cellulose, and hemicellulose thereof.

Below, a detailed description will be given of the method according to the present disclosure.

The lignocellulosic biomass in step (a) is a material including lignin and at least one of cellulose and hemicellulose and particularly may include lignin, cellulose, and hemicellulose together. Herbaceous biomass, woody biomass (typical woods) such as conifer and deciduous trees, and rice straw, corn stover, palm bark, sugar cane fall within the scope of the lignocellulosic biomass.

In the step of removing hemicellulose components, the lignocellulosic biomass may be pulverized biomass. In this regard, the hemicellulose is particularly pulverized into particles having a size of 20 mm or less and more particularly a size of 0.001 to 10 mm.

In addition, the lignocellulosic biomass in the step of removing hemicellulose components may undergo a drying process to reduce a moisture content therein. Through the drying process, the moisture content in the lignocellulosic biomass is reduced to 30 wt % or less, particularly to 20 wt % or less, and more particularly to 10 wt % or less, based on the weight of the resulting dried lignocellulosic biomass. So long as it reduces a moisture content of lignocellulosic biomass, any drying process such as oven drying, natural drying in an airy place, hot-air drying, etc. may be employed without limitations.

In the present disclosure, the pulverizing and drying step may be carried out independently and irrespective of the order thereof when conducted together. That is, a drying process may be subsequent to a pulverizing process and vice versa. The order of processes may be determined according to environmental conditions or the kind or dryness of the lignocellulosic biomass.

For example, when the lignocellulosic biomass is in a well dried state, the drying process may be omitted. It is advantageous in terms of efficiency to dry the lignocellulosic biomass that becomes large in surface area after pulverization.

Meanwhile, the step (a) of removing at least a part of hemicellulose components from lignocellulosic biomass accounts for a technical characteristic of the present disclosure. In order to obtain a bio-filler having an improved thermal decomposition property for plastics, this step may be controlled so that the final solid particles contain hemicellulose-derived components in an amount of 5 wt % and particularly in an amount of 3 wt %, based on the total weight of components derived from lignin, cellulose, and hemicellulose therein.

Here, the removal of hemicellulose from lignocellulosic biomass may be achieved by a process selected from a heat treatment process, a hot-water process, a steam explosion process, an acid-containing steam explosion process, and a combination thereof. So long as it is designed to remove hemicellulose from lignocellulosic biomass, any process may be employed. Particularly, the removal of hemicellulose components in step (a) may be conducted by a hot water process.

In this regard, the heat treatment process may include reacting lignocellulosic biomass at 100-400° C. and particularly at 150-330° C. for 10 minutes to 5 days and particularly for 20 minutes to 1 day and then obtaining a solid. The hot-water process may include reacting a mixture of lignocellulosic biomass and water at 80-250° C. and particularly at 120-200° C. for 10 minutes to 5 days and particularly for 20 minutes to 1 day, and then filtering the solid. The steam explosion process may include supplying water steam to lignocellulosic biomass, reacting the lignocellulosic biomass at 100-250° C. and particularly at 130-190° C. for 10 minutes to 5 days and particularly for 20 minutes to 1 day, and filtering the solid. In addition, the acid-containing steam explosion process may include feeding an inorganic acid such as hydrochloric acid, sulfuric acid, nitric acid, etc., an organic acid of 1 to 20 carbon atoms, or a mixture thereof plus the stem explosion process.

In the hot-water process, the content ratio of lignocellulosic biomass to water may be in the range of 5:1 to 1:30 on the basis of the respective weights added. In the acid-containing steam explosion process, the content ratio of lignocellulosic biomass to acid (10% (v/v)) may be in the range of 100:1 to 5:1 on the basis of the respective weights added.

Moreover, the present disclosure may further comprise a water-washing process or a drying process after the process of filtering the solid obtained according to the heat treatment process, the hot-water process, the steam explosion process, and the acid-containing steam explosion process.

After most of the hemicellulose is removed from lignocellulosic biomass by the heat treatment process, the hot-water process, the steam explosion process, or the acid-containing steam explosion process, the residual components in the lignocellulosic biomass are accounted for mainly by lignin and cellulose which is made to be hydrophobic and polymerized through treatment with acid, whereby an antibacterial bio-filler for plastics can be prepared.

That is, after most of the hemicellulose is removed from lignocellulosic biomass, the addition of an acid to the hemicellulose-removed lignocellulosic biomass in step (b) allows a polymerization modification toward a polymer form in which at least a part of the lignin and at least a part of the cellulose are chemically bonded to each other and a modification toward a modified lignocellulose solid material having hydrophobicity and oleophilicity occurs.

In step (b), the acid may be an organic acid of 1 to 20 carbon atoms; an inorganic acid selected from sulfuric acid, hydrochloric acid, phosphoric acid, nitric acid, and a combination thereof; a mixture of the organic acid and the inorganic acid; or a mixture of an organic acid and the combination of the inorganic acids.

As for the organic acid, which is a carboxylic acid-bearing carbon compound, its examples include mono-, bis-, tris-, tetracarboxylic acids, and so on, according to the number of carboxylic acid. The organic acid may be an organic acid of 1 to 20 carbon atoms, particularly an organic acid of 1 to 15 carbon atoms according to the number of carbon atoms, and more particularly acetic acid, formic acid, propionic acid, etc.

In addition, the inorganic acid may be exemplified by sulfuric acid, hydrochloric acid, or a mixture thereof. In a particular embodiment, sulfuric acid may be used in an amount of 0.5 to 70 wt % particularly in an amount of 0.6 to 65 wt %, and more particularly in an amount of 0.7 to 60 wt %, based on the total amount of the aqueous solution containing the pulverized biomass and the acid.

Here, for example, 75% (v/v) sulfuric acid may be added in such an amount that the final concentration of sulfuric acid is in the range of 0.5 wt % to 70 wt % (based on the total weight of the aqueous solution containing the pulverized biomass and sulfuric acid, particularly in the range of 0.6 wt % or 65 wt %, and more particularly in the range of 0.7 wt % to 60 wt %. The ratio may vary depending on optimal conditions for the kinds of the biomass. A similar mole number within the range may be calculated for hydrochloric acid when it is used. For a mixture of sulfuric acid and hydrochloric acid, its amount may be properly determined on the basis of the above range.

By the step of adding the acid catalyst, the molecular structure of the cellulose/lignin composite as the residual components in lignocellulosic biomass is altered. In this regard, many hydroxyl groups (—OH) and carboxyl groups (—COOH) present in the composite can be removed by dehydration and decarboxylation reactions with the acid, respectively, which results in hydrophobization of the biomass. In addition, lignin-cellulose molecules in modified forms are established by a polycondensation reaction and particularly by partial hydrolysis of cellulose components, and solid materials with various properties can be produced by varying weight ratios between lignin and cellulose molecules.

In greater detail, hydrophobic solid particles in a structurally complicated structure can be formed by conducting condensation/polymerization reactions between various functional groups present in lignin and cellulose molecules, together with the step in which an acid component such as hydrochloric acid, sulfuric acid, etc. is added to the lignocellulosic biomass while physically stirring, to remove a part of the hydrophilic cellulose from the constituents of lignocellulosic biomass by hydrolysis or the hydrophobization of cellulose/lignin molecules is induced through a dehydration reaction with hydroxyl groups (—OH) and a decarboxylation reaction with carboxyl groups (—COOH) in the molecules.

In particular, according to the present disclosure, antibacterial bio-fillers for plastics may be provided with various physical properties by varying lignin-cellulose rations in the solid particles thus obtained through appropriate adjustment of the cellulose hydrolysis reaction under controlled conditions for chemical reactions with the acid (reaction time, reaction temperatures, acid concentration, reaction pressure, etc.).

For the reaction by the acid addition, a temperature may be set in the range of 30-250° C. and particularly in the range of 70-140° C. The reaction may be carried out for 5 minutes to 12 hours.

In the present disclosure, step (c) is designed for adding a base to the reaction mixture obtained in step (b) to neutralize residual acid and for removing water-soluble materials from the neutralized reaction mixture. The neutralization step is necessary to avoid the problems occurring during polymer production in case the acid remains unremoved to plastic production. Thus, the residual acid is neutralized by a base.

The base to be used for the neutralization may be selected from sodium hydroxide (NaOH), potassium hydroxide (KOH), calcium hydroxide ($Ca(OH)_2$), ammonia ($NH_3$), lithium hydroxide (LiOH), calcium carbonate ($CaCO_3$), potassium carbonate ($K_2CO_3$), sodium carbonate ($Na_2CO_3$) potassium bicarbonate ($KHCO_3$), magnesium hydroxide ($Mg(OH)_2$), calcium oxide (CaO), magnesium oxide (MgO), and sodium bicarbonate (NaHCO3), and a combination thereof. However, so long as it neutralizes the acid, any base may be used with no limitations imparted thereto.

In this regard, the method may further comprise a step of adding water to the modified lignocellulosic biomass mixture resulting from the reaction of the acid with the lignocellulosic biomass to wash out the residual acid from the biomass, between steps (b) and (c). The acid washed out may be recovered and reused.

In addition, the removal of water-soluble materials from the neutralized reaction mixture in step (c) is set forth to remove water-soluble materials contained in the reaction mixture through dehydration and water washing and to recover the resultant solid substance. Here, the term "water-soluble material" refers to an ingredient dissoluble in an aqueous solution and is intended to encompass water-soluble materials such as residual sugars derived from biomass, materials derived in the acid addition process, and materials derived in the base addition process.

Removal of such water-soluble materials may be achieved by, for example, a washing process using an aqueous solution. In detail, the solid substance obtained after the step (c) of neutralization is washed with an aqueous solution to remove water-soluble salts obtained by adding the acid and base ingredients and parts of hydrolyzed saccharides from lignocellulosic biomass. As a result, the solid particles may be obtained as a solid substance of modified lignocellulosic biomass in an amount of at 30 wt % or more, particularly in an amount of 40 wt % or more, more particularly in an amount of 50 wt % or more, and even more particularly in an amount of 60 wt % or more, and even more particularly in an amount of 70 wt % or more, relative to the dry weight of the biomass fed, by removing a certain amount of the polysaccharides hydrolyzed by the acid.

At the yield, the solid substance thus obtained in a modified form of the lignocellulose biomass can exhibit good physical properties such as antibacterial activity and dispersibility.

The method according to the present disclosure may further comprise step (d) of pulverizing the solid particles obtained by removing water-soluble materials from the neutralized reaction mixture, subsequent to step (d).

Step (d) of pulverizing the solid particles is adapted to prepare an antibacterial bio-filler for plastics into a powder form that exhibits better dispersibility and improved compatibility with additives and is easy to handle. In step (d), the solid substance deprived of water-soluble matter by washing, etc. in step (c) is dried to the degree of 5 wt % or less of moisture and finely pulverized into powder having an average size of 0.1-100 μm.

The solid material obtained in step (c) of the present disclosure may contain a lignin-derived component in an amount of 1 wt % to 99 wt %, based on the total weight of components derived from lignin, cellulose, and hemicellulose, particularly in an amount of 20 wt % to 80 wt %, more particularly in an amount of 25 wt % to 75 wt %, and even more particularly in an amount of 30 wt % to 70 wt %.

In addition, the solid material obtained in step (c) may contain a cellulose-derived component in an amount of 1 wt % to 99 wt %, based on the total weight of components derived from lignin, cellulose, and hemicellulose, particularly in an amount of 20 wt % to 80 wt %, more particularly in an amount of 25 wt % to 75 wt %, and even more particularly in an amount of 30 wt % to 70 wt %.

Furthermore, the solid material obtained in step (c) of the present disclosure may contain a lignin-derived component in an amount of 20 wt % to 80 wt % and a cellulose-derived ingredient in an amount of 20 wt % to 80 wt %, based on the total weight of components derived from lignin, cellulose, and hemicellulose.

The bio-filler for plastics according to the present disclosure may be applied to any plastics that requires antibacterial activity irrespective of kinds of plastics. The plastic may be particularly at least one selected from the group consisting of polypropylene (PP), polyethylene (PE), polyvinyl chloride (PVC), polystyrene (PS), polyurethane, polycarbonate, polyurea, polyimide, polyamide, polyacetal, polyester, nylon, epoxy resin, acrylic resin, acrylonitrile-butadiene-styrene (ABS), polylactic acid, polybutylene adipate terephthalate, and polybutylene succinate.

The bio-filler prepared according to the method for preparing a bio-filler for plastics according to the present disclosure is a result of various reactions of lignin and cellulose components deprived of hemicellulose components low in thermal decomposition properties, such as dehydration/decarboxylation/condensation/polymerization, etc., in the presence of an acid catalyst for various periods of time under temperature and pressure conditions, and amounts structurally to a composite mixture of and polymers, but not to a single compound. When used as a filler for plastics after hydrophobization of the lignin components, the bio-filler of the present disclosure exhibits antibacterial activity and can substitute for talc to prepare a lightweight plastic materials.

In addition, having higher hydrophobicity than bio-fillers prepared by simply finely pulverizing general lignocellulosic biomass, the bio-filler of the present disclosure exhibits improved compatibility with polyolefin plastics (polyethylene (PE), polypropylene (PP), polyvinylchloride (PVC), polystyrene (PS), etc.) and biopolymers (polybutylene adipate terephthalate (PBAT), polylactic acid (PLA), polybutylene succinate (PBS)) and can provide improved mechanical properties for the plastics.

In accordance with another aspect thereof, the present disclosure provides an antibacterial bio-filler for plastics, prepared by the method for preparing a bio-filler for plastics. In addition, the present disclosure provides an antibacterial plastic composition comprising the antibacterial bio-filler.

The plastic composite material containing the bio-filler of the present disclosure can exhibit antibacterial activity while retaining physical properties of the petroleum plastic employed, and as such, is commercially very valuable.

Typically, isolated cellulose or lignin is of poor general purpose because its hydrophilicity causes many problems upon compounding with plastics. However, the bio-filler for plastics according to the present disclosure becomes hydrophobic through acid treatment and neutralization and thus is compatible with general-purpose plastics and easy to handle as well. In addition, the bio-filler for plastics is controlled to contain in an amount of as low as 5 wt % and particularly 3 wt %, based on the total weight of lignin, cellulose, and hemicellulose in the solid particles finally obtained or to be almost free of hemicellulose, whereby a plastic substance comprising the bio-filler can be provided with improved thermal decomposition properties and surface characteristics.

Since detailed processes in each step are designed to conduct hemicellulose removal and acid treatment directly on the raw material lignocellulose biomass without separate purification of cellulose and lignin, the method of the present disclosure has an advantage over conventional techniques to prepare an antibacterial bio-filler in a simple and economically beneficial viable mode at high yield.

Typically, the plastic materials or products may vary in physical properties, depending on contents of bio-fillers therein. The bio-filler for plastics according to the present disclosure may be added in an amount of 0.1 to 90 wt %, based on the total weight of the plastic, particularly in an amount of 0.5 to 40 wt %, and more particularly in an amount of 1 to 20 wt %.

By way of example, 0.1 to 30 wt % of a powder of the bio-filler prepared according to the present disclosure and other additives may mixed with a petroleum base resin such as PP, PE, PVC, and the like to afford a composite resin which may be then injected/extruded into plastic substance and products.

In addition, the plastic composite substance may further comprise various additives such as an antioxidant agent, a colorant, a releasing agent, a lubricant, a photostabilizer, a rubber, etc. Contents of these additives may be properly adjusted depending on various factors including final uses and characteristics of the plastic substances.

In accordance with another aspect thereof, the present disclosure provides an antibacterial product comprising the plastic composition.

A better understanding of the present disclosure may be obtained through the following examples which are set forth to illustrate, but are not to be construed as limiting the present disclosure.

[Experimental Example 1] Modification Reaction of Lignocellulosic Biomass

Lignocellulosic biomass to be modified was obtained from pine trees grown in Korea. The biomass was pulverized into pieces less than 1 mm in diameter before hot water treatment. With respect to the hot water treatment, reference was made to the document (Bioresource Technology, 2016, vol. 216. pp: 862-869, Liquid hot water pretreatment of multi feedstocks and enzymatic hydrolysis of solids obtained thereof).

First, pine tree powder was fed as the biomass at a mass ratio of 1:10 with water to a stainless-steel reactor, followed by reaction at 190° C. for 60 minutes. After completion of the reaction, the reactor was cooled to less than 100° C. and the solid substance was recovered through filtration, washed twice with water, and dried at 70° C. in a drier to afford a lignocellulose solid deprived of hemicellulose.

The lignocellulose solid obtained was treated with 75% (v/v) sulfuric acid at a reaction temperature of 120° C. for various reaction times with the acid catalyst varying in concentration, as suggested in Table 1. The solid reaction mixture samples thus obtained were washed twice with water, neutralized with 10 N potassium hydroxide to a pH of 7.0, and then washed again twice with water. The washed solids were dried at 120° C. for 6 hours in a drier before being pulverized to afford a bio-filler as particles with a size of 0.1-50 μm.

TABLE 1

| # | Acid Catalyst Conc. (wt %) | Reaction time (min) | Solid recovery (%) | Content ratio (%) of lignin:cellulose:hemi-cellulose in solid obtained after reaction | Note |
|---|---|---|---|---|---|
| 0-1 | 0 | 0 | 100 | 31.7:46.3:22.0 | Control |
| 0-2 |  | 60 | 96 | 31.6:46.2:18.3 | Control |
| 0-3 | 0.1 | 30 | 90 | 37.3:55.7:7.0 | Control |
| 1 | 1 | 10 | 80 | 39.6:57.9:2.5 |  |
| 2 |  | 20 | 75 | 39.9:60.1:0.0 |  |
| 3 |  | 60 | 71 | 43.2:56.8:0.0 |  |
| 5 | 2 | 10 | 78 | 39.4:60.6:0.0 |  |
| 6 |  | 20 | 71 | 42.9:57.1:0.0 |  |
| 7 |  | 60 | 63 | 48.7:51.3:0.0 |  |
| 8 | 5 | 10 | 73 | 42.1:57.9:0.0 |  |
| 9 |  | 20 | 67 | 45.8:54.2:0.0 |  |
| 10 |  | 60 | 58 | 59.0:40.1:0.0 |  |
| 11 | 50 | 10 | 50 | 90:10:0 |  |
| 12 |  | 20 | 46 | 95:5:0 |  |
| 13 |  | 60 | 43 | 99:1:0 |  |

In Table 1, the content ratios of lignin:cellulose were determined according to the standard biomass analytical methods provided by NREL (Determination of structural carbohydrates and lignin in biomass, revision Sep. 3, 2012).

In addition, the obtained solid substances were each identified as macromolecular polymers insoluble in any solvent as indicated by a solubility of less than 1% in ethanol, acetone, butanol, hexane, toluene, cyclohexane, dimethyl sulfoxide, dimethyl formamide, and so on.

[Experimental Example 2] Antibacterial Activity of Biomaterial

The bio-filler prepared under #10 condition of Experimental Example 1 was pulverized into particles with a size of 0.1-50 μm and assayed for antibacterial activity according to contents thereof. First, M9 agars were prepared to contain 1 wt %, 5 wt %, and 10 wt % of the biomaterial, respectively.

As for M9 salts, 64 g of $Na_2HPO_4$-$7H_2O$, 15 g of $KH_2PO_4$, 2.5 g of NaCl, and 5.0 g of $NH_4Cl$ were contained per liter of DW. Each M9 agar was prepared with 800 ml of the M9 salt solution, 2 ml of 1 M $MgSO_4$, 20 ml of 20 wt % glucose, 100 μl of 1 M $CaCl_2$, and 15 g of agar.

After seed growth to about OD600=1, Gram-negative *E. coli* and Gram-positive *S. aureus* were each $10^{-6}$ fold diluted and spread over the M9 agar plates prepared above for assaying antibacterial activity. The results are depicted in FIG. 1.

FIG. 1 shows M9 agar plates containing 1% of the biomaterial on which *E. coli* and *S. aureus* were spread and grown for 12 hours. As can be seen in FIG. 1, neither *E. coli* nor *S. aureus* were grown in any of the M9 agar plates containing 1 wt %, 5 wt %, and 10 wt % of sample #10, demonstrating the antibacterial activity of the biomaterial. In contrast, both *E. coli* and *S. aureus* were observed to grow on the M9 agar plate containing 1% of sample #0-3. This sample exhibited antibacterial activity in a dose-dependent manner, but was inferior to sample #10 in terms of antibacterial activity.

[Experimental Example 3] Dispersibility in Plastic and Surface Characteristic of Biomaterial The samples prepared by hydrophobization under the conditions #0-1, #0-3, and #1 in Experimental Example 1 were assayed for dispersibility in plastics and surface characteristic.

Figure 2:
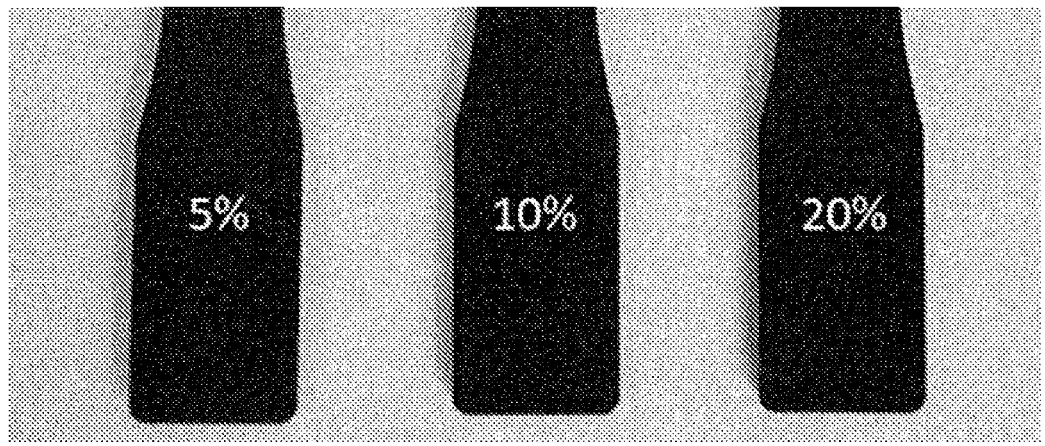
FIG. 2 is a photographic image of ASTM standard specimens prepared from dry composite resins containing various contents of the bio-filler prepared in the Example according to the present disclosure so as to evaluate dispersibility of the bio-filler.

In brief, PP (J-370, Lotte Chemical) composite resins respectively containing 5 wt %, 10 wt %, and 20 wt % of the biomaterial of sample #1 condition were prepared and maintained to retain a moisture content of less than 0.1 wt % before specimen preparation. ASTM standard specimens were prepared from the dry composite resins and are depicted in FIG. 2. As can be seen in FIG. 2, the biomaterials were observed to be well dispersed in the plastic specimens.

Figure 3:
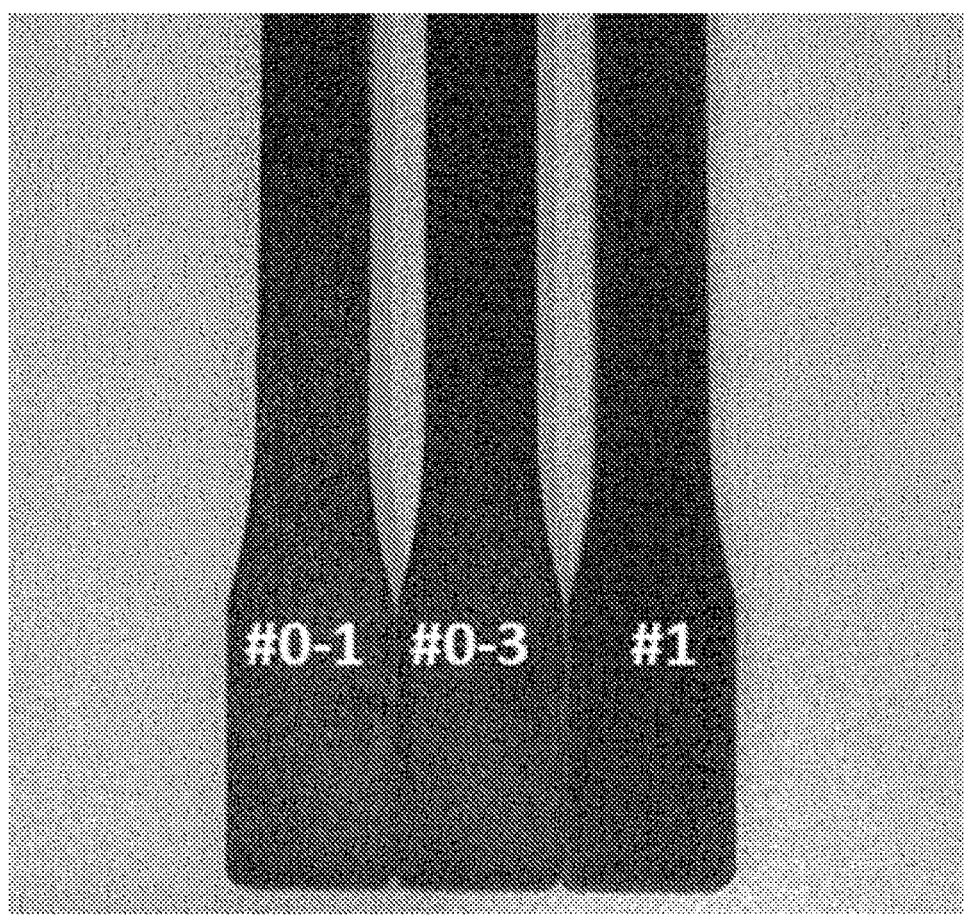
FIG. 3 is a photographic image of ASTM standard specimens constructed by injecting PP composite resins containing 10 wt % of each of the bio-fillers in the Example and Comparative Example so as to evaluate surface characteristics of the plastics according to the present disclosure.

Samples #0-1, #0-3, and #10 were pulverized to prepare biomaterials as particles with a size of 0.1-50 μm. PP (J-370, Lotte chemical) composite resin containing 10 wt % of each of the above prepared biomaterials was injected at 250° C. into ASTM standard specimens shown in FIG. 3 and observed for surface characteristics.

In the samples #0-1 and #0-3 from which hemicellulose were not removed, surface defects (silver streak) caused by the gas generated during the thermal decomposition of hemicellulose upon injection were observed. In contrast, the plastic surface defects were remarkably reduced for sample #1 which contained residual hemicellulose in an amount of less than 2.5%. Plastic's surface characteristics are not important in agricultural materials such as mulching films and plastic honeycomb, but are very important physical characteristics considered as the most important property in the high-value plastic goods such as in vehicles and home appliance industries which values the aesthetics of product surfaces.

[Experimental Example 4] Physicochemical Characteristics of Biomaterial-Containing Plastics As shown in Table 2, the biomaterial of condition #10 was added in an amount of 0% and 10% to PP (Y-120, Lotte Chemical) to prepare respective PP composite resins from which ASTM standard specimens were constructed. Their physical properties were examined.

TABLE 2

Physical Property of Biomaterial-Added Plastic

| Test item | Test method | Unit | Biomaterial content (%) | |
|---|---|---|---|---|
| | | | 0 (control; J-120) | 20 (test group) |
| MI (230° C., 2160 g) | D1238 | g/10 min | 1.0 | 2.0 |
| Specific gravity | D792 | g/cm³ | 0.91 | 0.92 |
| Tensile strength | D638 | kgf/cm² | 370 | 365 |
| Flexural elasticity | D790 | kgf/cm² | 12107 | 17833 |
| Flexural strength | D790 | kg/cm² | 422 | 444 |
| IZOD 23° C. | D256 | kg · cm/cm | 3.9 | 4.2 |
| ROCKWELL hardness | D785 | R-scale | 99 | 85 |

As understood from the data of Table 2, an improvement was made by 100% for MI (Melt index), by 47% for flexural elasticity, and by 7.7% for impact strength.

[Experimental Example 5] Physicochemical Characteristics of Plastic According to Biomaterial As shown in Table 3, the biomaterials with various lignin:cellulose content ratios were each added in an amount of 10% to PP (J-350, Lotte Chemical) to prepare respective PP composite resins from which ASTM standard specimens were constructed. Their physical properties were examined.

TABLE 3

Influence of Lignin:Cellulose Content Ratio of Biomaterial on Physical Property of Plastic

| Test item | Test method | Unit | Biomaterial content: 20 wt % | | |
|---|---|---|---|---|---|
| | | | #2 | #10 | #11 |
| MI (230° C., 2160 g) | D1238 | g/10 min | 1.3 | 1.7 | 2.1 |
| Specific gravity | D792 | g/cm³ | 0.96 | 0.94 | 0.92 |
| Tensile strength | D638 | kgf/cm² | 517 | 432 | 274 |
| Flexural elasticity | D790 | kgf/cm² | 17833 | 16933 | 16230 |
| Flexural strength | D790 | kg/cm² | 396 | 404 | 414 |
| IZOD 23° C. | D256 | kg · cm/cm | 4.5 | 4.2 | 3.9 |
| ROCKWELL hardness | D785 | R-scale | — | — | 83 |

As is understood from the data of Table 3, according to the present disclosure the flexural elasticity and impact strength were improved as the content of the modified cellulose increased.

INDUSTRIAL APPLICABILITY

The present disclosure is concerned with a method for preparing an antibacterial bio-filler for plastics and an antibacterial bio-filler for plastics, prepared thereby, and the bio-filler can be applied as a substance for plastics.

The invention claimed is:

1. A method for preparing a bio-filler for a plastic, the method comprising the steps of:
    (a) removing at least a part of hemicellulose from lignocellulosic biomass to form hemicellulose-removed lignocellulosic biomass, wherein the lignocellulosic biomass comprises lignin, cellulose, and hemicellulose;
    (b) modifying the hemicellulose-removed lignocellulosic biomass with an acid to form an acid-treated reaction mixture; and
    (c) adding a base to the acid-treated reaction mixture to neutralize remaining acidic components to form a neutralized reaction mixture, followed by removing water-soluble materials from the neutralized reaction mixture to form solid particles,
    wherein the solid particles obtained in step (c) contain hemicellulose-derived components formed through step (b) and step (c) in an amount of 3 wt % or less, based on the total weight of lignin-derived components, cellulose-derived components, and hemicellulose-derived components formed through step (b) and step (c).

2. The method of claim 1, wherein the acid in step (b) is an organic acid of 1 to 20 carbon atoms; an inorganic acid selected from sulfuric acid, hydrochloric acid, phosphoric acid, nitric acid, and a combination thereof; a mixture of the organic acid and the inorganic acid; or a mixture of an organic acid and the combination of the inorganic acids.

3. The method of claim 1, wherein the solid particles in step (c) contain lignin-derived components in an amount of 20 wt % to 80 wt % and cellulose-derived components in an amount of 20 wt % to 80 wt %, based on the total weight of the lignin-derived components, the cellulose-derived components, and the hemicellulose-derived components.

4. The method of claim 1, wherein the removal of the hemicellulose from the lignocellulosic biomass in step (a) is conducted by a process selected from a heat treatment process, a hot-water process, a steam explosion process, an acid-containing steam explosion process, and a combination thereof.

5. The method of claim 1, wherein the removal of the hemicellulose in step (a) is conducted by a hot water process.

6. The method of claim 1, wherein the acid in step (b) is sulfuric acid which is used at a concentration of 0.5 to 70 wt %, based on the total weight of aqueous solution including pulverized biomass and acid.

7. The method of claim 1, wherein the base in step (c) is selected from sodium hydroxide (NaOH), potassium hydroxide (KOH), calcium hydroxide (Ca(OH)$_2$), ammonia (NH$_3$), lithium hydroxide (LiOH), calcium carbonate (CaCO$_3$), potassium carbonate (K$_2$CO$_3$), sodium carbonate (Na$_2$CO$_3$), potassium bicarbonate (KHCO$_3$), magnesium hydroxide (Mg(OH)$_2$), calcium oxide (CaO), magnesium oxide (MgO), and sodium bicarbonate (NaHCO$_3$), and a combination thereof.

8. An antibacterial bio-filler for plastics, prepared by the method of claim 1.

9. An antibacterial plastic composition comprising the antibacterial bio-filler for plastics of claim 8.

10. The antibacterial plastic composition of claim 9, comprising the antibacterial bio-filler for plastics in an amount of 0.1 to 90 wt %, based on the total weight thereof.

11. An antibacterial product comprising the plastic composition of claim 10.

* * * * *